May 1, 1956 H. C. RORDEN 2,744,225

AUTOMATIC CURVE FOLLOWER

Filed Feb. 27, 1952

INVENTOR
H. C. RORDEN
BY N. S. Ewing
ATTORNEY

United States Patent Office 2,744,225

Patented May 1, 1956

2,744,225

AUTOMATIC CURVE FOLLOWER

Henry C. Rorden, Westfield, N. J., assignor to Bell Telephone Laboratories, Incorporated, New York, N. Y., a corporation of New York Application February 27, 1952, Serial No. 273,749

4 Claims. (Cl. 318—32)

This invention relates to automatic curve translators, that is, to devices adapted to derive automatically from a graphic representation of a mathematical function a time-varying voltage of the same form.

In the analog computer art the practice has been to incorporate into the computer electrical devices that supply, whenever called upon, time-varying voltages that represent certain frequently needed mathematical functions, and to have the operator supply functions that are needed rarely as a voltage that is time-varied in the required manner by manual control. These practices, however, do not fully meet the need experienced in circumstances where a particular mathematical function is used continuously for a limited time. Under such conditions the period of use does not justify the expense and time consumed in constructing an electrical device, and in the same instance the use might be so continuous as to make a use of the manual control objectionably laborious, time-consuming and untrustworthy.

To meet the foregoing need it has been proposed to plot the mathematical function on a flat surface, marking the course of the plotted curve with a mechanical track or the like, adapted to guide an automatic curve follower along it, and to translate the motion of the follower into the desired time-varying voltage. Another proposal that has been made involves, first, representing the function graphically as a band that has distinctive optical properties, for example, a band of highly reflective or translucent material, which represents the curve, on a dull or opaque background, and providing photoelectric controls to guide a follower along the band. The first proposal has the disadvantage, of course, that a mechanical track or the like must be fabricated for each function to be used, and the second proposal suffers from a lack of accuracy.

The objects of the present invention are to simplify, reduce the cost, and to increase the flexibility, accuracy and speed of operation in the automatic translation of mathematical functions into corresponding electrical forms.

In accordance with a feature of the invention, the operator need only apply a band of electrically conductive paint or the like along one side of a line plot of the function to prepare the graphic representation for automatic translation.

The invention contemplates the use of a chart marked with a broad band of electrically conductive paint, one boundary of which coincides with the curve that is to be traced, and a conductive stylus that moves, relative to and in contact with the chart, progressively in one coordinate direction across the chart and reversibly in the other coordinate direction. The reversible motion is controlled by a circuit that causes the stylus to move in one sense when there is no contact between the stylus and chart, and in the opposite sense when that contact is made so that as the stylus moves steadily in the one coordinate direction it oscillates back and forth across the boundary following the configuration of the curve in the second coordinate direction. The stylus motion is translated then into time-varying voltage forms, the primary voltage form corresponding to the general motion of the stylus, and the stylus oscillations appearing as fluctuations in the primary voltage form. These stylus oscillations and resulting voltage fluctuations are small and occur rapidly so that in medium and low speed analog computers their effect on problem accuracy is generally negligible.

The nature of the present invention and its various features and objects will appear more fully upon consideration of the accompanying description and drawings.

Figures 1, 2A, 2B:
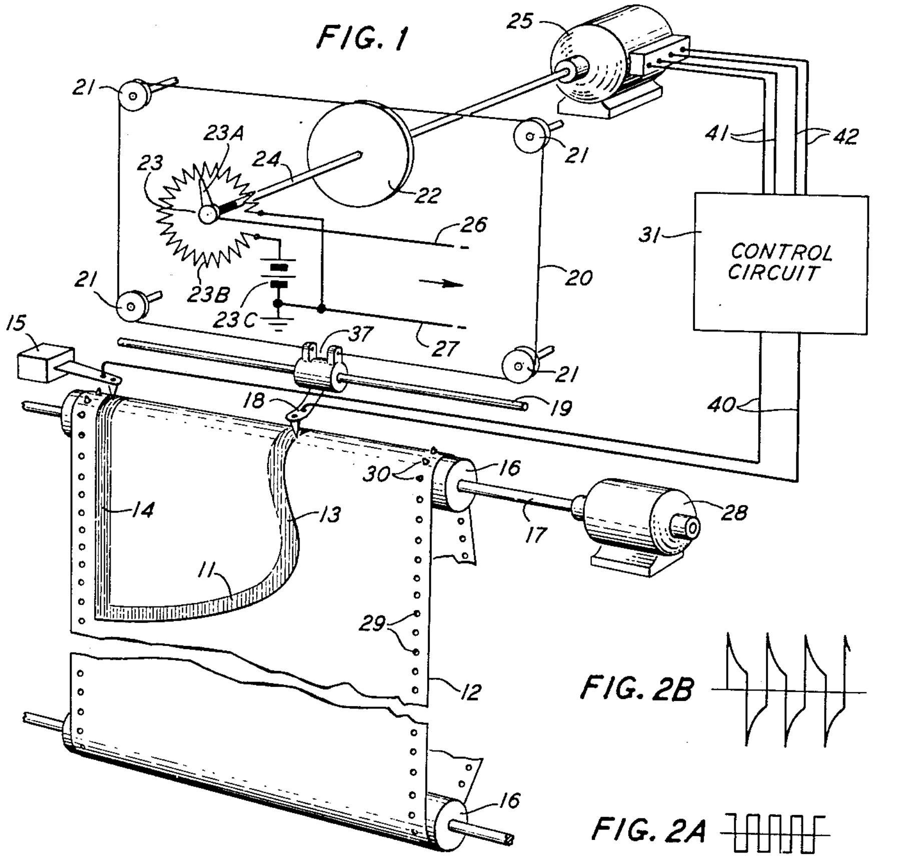
Fig. 1 is a diagrammatic representation of a curve translator system in accordance with the invention.
Figs 2A and 2B are descriptive of voltage forms appearing in the electrical circuit of Fig. 2.

Referring particularly to Fig. 1, the mathematical function $f(t)$ is plotted in this embodiment in rectangular coordinates, on a chart 12, as a curve 13 which is one boundary of a broad conductive band 11, of an electrically conductive paint or the like that has been applied by the operator. The chart may be of any flexible insulating material, such as paper, cloth, or plastic. The band may be of any type of easily applied conductive medium, such as colloidal graphite in water, silver paste or graphite applied by lead pencil. The chart itself is held by a pair of parallel spaced rollers 16 which have teeth 30 to engage perforations 29 along the edge of the chart to prevent slippage. The chart is driven steadily in one of its coordinate directions, say, the X direction, by a motor 28 that is connected to one of the rollers 16.

A stylus 18, supported from a carrier 37 that slides on a fixed rod 19, moves in contact with the chart 12 in the second coordinate direction, say, the Y direction. The stylus is so mounted as to provide a slight pressure between the stylus against the chart of a magnitude sufficient to insure continuous contact between the stylus and chart and without making the frictional force between the chart and stylus prohibitive. The stylus 18 is driven along the rod by a reversible motor 25 through a drum 22 on the motor shaft 24 and an endless belt 20 that rides over pulleys 21 and the drum 22. The rotary contact 23A of a potentiometer 23 is also driven from the motor shaft 24 so that it is rigidly mechanically coupled to the stylus 18 and its position is uniquely related to the position of the stylus along the rod 19, or in the Y direction. Battery 23C is connected to the terminals of the potentiometer resistor 23B, and the output of the potentiometer, which is also the effective output of the curve translator, appears on leads 26 and 27, the lead 26 being connected to the rotary contact 23A and the lead 27 connected to the negative pole of the battery 23C and to ground.

While the mechanical elements of the system are described above in detail, a more complete description of suitable control systems and chart-moving devices may be found in Patents 2,074,118 of March 16, 1937, to R. W. Ross et al., and 2,113,164 of April 5, 1938, to A. J. Williams, Jr.

Stylus 18 is made to follow the curve 13 as a result of the effect of making and breaking electrical contact with the conductive band 11. For this purpose a stylus circuit 40 is provided, comprising an electrical connection to the stylus itself and a continuous electrical connection with band 11. In this embodiment the conductive band 11 is closed on a conductive base line 14 with which a fixed conductive stylus 15 maintains contact as the chart progresses in the X direction.

The stylus circuit 40 leads to a control circuit 31, which tends to halt and reverse the direction of rotation of the motor 25 each time the stylus 18 makes or breaks contact with the band 11. More specifically, when the stylus is in contact, the motor is caused to drive the stylus to the observer's right and in the opposite sense when the stylus is not in contact.

Figure 2:
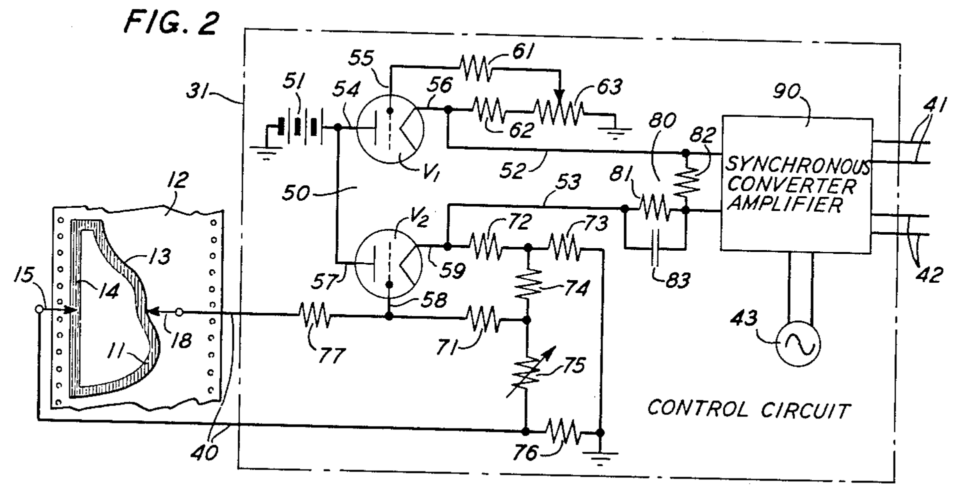
Fig. 2 shows details of one of the component elements of Fig. 1.

The control circuit 31 comprises a switching circuit 50 that operates so long as the stylus circuit 40 is closed to produce across a pair of conductors 52 and 53 a unidirectional voltage of one polarity, and a unidirectional voltage of the opposite polarity when the stylus circuit is open. The conductors 52 and 53 are connected to a synchronous converter amplifier 90 of well-known form through which alternating current power from a source 43 is supplied to the output conductor pairs 41 and 42 in one relative phase or another, depending upon the polarity of the voltage in conductors 52 and 53. The direction of rotation of the two-phase motor 25 to which the conductor pairs 41 and 42 are connected depends upon the relative phase of the alternating current power in the conductor pairs; so that the motor will tend to rotate in one sense when the stylus circuit 40 is open and one of the two relative phases prevails, and in the opposite sense when the stylus circuit is closed and the other relative phase prevails. The control circuit 31 is illustrated in detail in Fig. 2.

In the control circuit 31, the switching circuit 50 comprises two cathode followers of triode tubes $V_1$ and $V_2$, both plate elements of which are connected to the positive pole of a battery 51. The cathode of $V_1$ is connected to the conductor 52 and to ground through a fixed resistor 62 and the resistor of a potentiometer 63, the rotary contact of which is connected to the grid of $V_1$ through resistor 61. The cathode of $V_2$ is connected to the conductor 53 and to resistors 72 and 73, the latter of which is shunted to ground through the fixed resistor 74, a variable resistor 75 and a fixed resistor 76 connected in series. The fixed stylus 15 of stylus circuit 40 is also connected to resistors 75 and 76, and the resistors 74 and 75 are also connected to the grid of $V_2$ through resistor 71 which is in turn connected to the movable stylus 18 of stylus circuit 40 through resistor 77. In this arrangement the cathode follower tube $V_1$ is biased so that for any one setting of the balancing potentiometer 63, the potential to ground in conductor 52 is constant, and the cathode follower tube $V_2$ is biased so that the potential with respect to ground in conductor 53 is constant for any one setting of resistor 75 when the stylus circuit 40 is open. The values of the resistors in both cathode followers are chosen so that under the above operating conditions, the potential in conductor 53 is positive with respect to the potential in conductor 52. Under such conditions, the potential between the grid and cathode of $V_2$ is less than that between the grid and cathode of $V_1$. However, when the stylus circuit 40 is closed, the potential between the grid and cathode of $V_2$ increases over that in $V_1$, and the potential in conductor 53 decreases with respect to that in conductor 52, thereby causing conductor 53 to become negative with respect to conductor 52. Hence, under operating conditions where the stylus circuit is opening and closing, the voltage in conductors 52 and 53 will appear as a square wave as illustrated in Fig. 2A. The resistors 63 and 75 may be variable for purposes of control. With the amplitude control 75 set at a minimum resistance and the stylus circuit 40 open, the balancing potentiometer 63 is adjusted until the potential difference between the conductors 52 and 53 is zero. The amplitude control 75 is then adjusted to establish the desired potential difference between the conductors 52 and 53 as discussed below.

Even after the stylus circuit has opened or closed, causing a reversing signal to be sent to the synchronous converter amplifier 90, the movable stylus 18 continues in its original path and overshoots the curve boundary due to the inertia of the motor 25 and connected parts. The time consumed in reversing the rotation of the motor and, therefore, also the amount of overshoot, can be reduced by increasing the initial voltage of the reversing signal, for the amount of alternating current power delivered from source 43 to the motor 25 is a function of the magnitude of the voltage impressed on synchronous converter amplifier 90 from conductors 52 and 53. For this purpose a resistor-condenser network 80 is provided which receives the square wave signal from the switching circuit 50 and allows the high frequency components of the square wave signals to pass through the network while blocking the low frequency components so that the output signal is peaked at its leading edge, gradually decreasing to its normal magnitude. A sequence of square waves fed into the network 80 will appear in its output as peaked waves, according to the illustration of Fig. 2B. The network resistor 81 is placed in the line of the conductor 53 and is shunted by the capacitor 83, and the resistor 82 connects conductors 52 and 53 at a point in the network most distant from the switching circuit 50. This arrangement and number of the elements in the network 80 and the switching circuit 50 is merely suggested, and any suitable combination thereof might be substituted.

A suitable converter amplifier is described in Patent No. 2,485,948 of October 25, 1949, to A. J. Williams, Jr., et al., and is incorporated in the Speedomax Type G Double Element Recorder made by the Leeds and Northrup Company. This recorder also comprises a suitable mechanical control system and chart-moving device.

Inasmuch as a large motor connection voltage of broad frequency characteristics causes violent hunting action of the stylus that is detrimental to the accuracy of the device, and a small motor correction voltage which introduces less hunting action drastically limits the speed at which the curve may be fed under the stylus, it is necessary for best performance under normal conditions of operation to select an optimum motor correction voltage that will permit reasonable speeds of operation without introducing an excessive hunting action. For this reason, the amplitude control 75 in the exemplary embodiment is adjusted to an optimum differential voltage between leads 52 and 53 of about 0.050 volt which permits operating speeds of 20 inches per minute and limits the stylus hunting motion to about one-sixteenth of an inch on standard Leeds and Northrup Speedomax chart paper.

Additionally, in this embodiment the conductive curve is a broad band of conductive material that is electrically closed on itself and of a resistance that is small compared to one megohm. However, the area between the curve and the base line may be completely coated with the conductive medium or the curve may be of any other arrangement or configuration which will properly define the curve, permit continuous electrical contact to be maintained with the curve and be of a resistance that is operationally compatible with the electrical circuit to which it is connected. Also the chart holder drive has been described as providing progressive motion in the X coordinate direction, but another embodiment might provide reversible motion in the X coodinate direction and appropriate control means for direction of this reversible motion. While any number of values might be substituted, the values used in one instance in practice were:

| | |
|---|---|
| Tube $V_1$ | ½ 2C51. |
| Tube $V_2$ | ½ 2C51. |
| Source 51 | 100 volts. |
| Resistor 61 | 1 megohm. |
| Resistor 62 | 2,000 ohms. |
| Resistor 63 | 200 ohms. |
| Resistor 71 | 1 megohm. |
| Resistor 72 | 2,000 ohms. |
| Resistor 73 | 200 ohms. |
| Resistor 74 | 2,200 ohms. |
| Resistor 75 | 25,000 ohms. |
| Resistor 76 | 2,200 ohms. |
| Resistor 77 | 10,000 ohms. |
| Resistor 81 | 60,000 ohms. |
| Resistor 82 | 0.1 megohm. |
| Capacitor 83 | 1 microfarad. |

It is understood that the invention is not limited to the specific arrangements here described and that modifications and changes may be made without departing from the spirit or scope of the invention.

What is claimed is:

1. A control circuit for use in an automatic curve follower adapted to track the boundary between conductive and non-conductive portions of the surface of a chart and which curve follower comprises a holder for the chart, an electrically conductive stylus adapted to make contact with said chart, said chart holder and stylus being mounted for relative movement in two coordinate directions, and a reversible two-phase motor connected to the stylus for providing a reversible movement in one coordinate direction, said control circuit producing the motor directional power to control the drive each time the stylus makes or breaks contact with said conductive portion comprising an electrical stylus circuit one side of which is connected to the stylus and the other side of which is arranged to maintain constant contact with said conductive portion, an electronic switching circuit directly responsive to the making and breaking of contact by the stylus and conductive portion connected to said stylus circuit, said circuit producing signals to drive said stylus in one coordinate direction when the stylus and conductive portions are not in contact and to drive said stylus in the opposite direction when contact is made by said stylus and conductive portion, a synchronous signal frequency converter and amplifier connected to said switching circuit which supplies directional power to the reversible motor and a source of alternating current connected to said signal frequency converter and amplifier.

2. A control circuit according to claim 1 in further combination with an electrical conductive network for peaking the signals from the switching circuit into the signal frequency converter and amplifier.

3. A control circuit according to claim 1 wherein the switching circuit emits a signal of a given polarity when the stylus circuit is open and of an opposite polarity when the stylus circuit is closed.

4. An automatic curve translator according to claim 1 in which said electronic switching circuit comprises a first cathode follower amplifier for providing a first value of potential output and a second cathode follower amplifier for providing a second value of potential output, said second cathode follower amplifier adapted to have a value of cathode potential output of one polarity with respect to said first cathode follower output when said electrical stylus circuit is open and value of cathode potential of opposite polarity with respect to said first cathode follower potential when said electrical stylus circuit is closed.

References Cited in the file of this patent

UNITED STATES PATENTS

| | | |
|---|---|---|
| 2,113,436 | Williams | Apr. 5, 1938 |
| 2,262,354 | Cates | Nov. 11, 1941 |
| 2,354,391 | McCourt | July 25, 1944 |
| 2,588,386 | Hubbard et al. | Mar. 11, 1952 |
| 2,594,716 | Bailey | Apr. 29, 1952 |
| 2,598,937 | Parker | June 3, 1952 |
| 2,622,871 | Martin | Dec. 23, 1952 |